R. B. SCOTT.
Tire-Tightener.

No. 19,721.                  Patented Mar. 23, 1858.

UNITED STATES PATENT OFFICE.

ROBERT B. SCOTT, OF PHILADELPHIA, PENNSYLVANIA.

TIGHTENING THE TIRES OF CARRIAGE-WHEELS.

Specification of Letters Patent No. 19,721, dated March 23, 1858.

*To all whom it may concern:*

Be it known that I, ROBERT B. SCOTT, of the city of Philadelphia and State of Pennsylvania, have invented a new and Improved Mode of Securing and Tightening Tires to Wheels; and I do hereby declare the following to be a full, clear, and exact description of the same, reference being had to the accompanying drawing and to the letters of reference marked thereon.

My invention consists in securing the two ends of a tire together and binding the whole firmly to the felly of a wheel by means of taper keys fitting into slotted lips in one end of the tire, and in a slotted enlargement on the opposite end of the tire, one end being so bent, that the other may lap over it, and so secured to the felly by means of a bolt, that the tire may be readily tightened to the wheel, and, at the same time, the latter may retain its uniformity and truth.

My invention, although applicable to the wheels of all common road vehicles, is particularly adapted to those of wagons used in Government and emigrant trains, in which a ready mode of tightening the tires without resorting to the usual means of removing, cutting, and rewelding the same or driving wedges between the tire and felly, is most desirable.

In order to enable others skilled in the art to make and use my invention, I will now proceed to describe its construction and operation.

Figure 1:
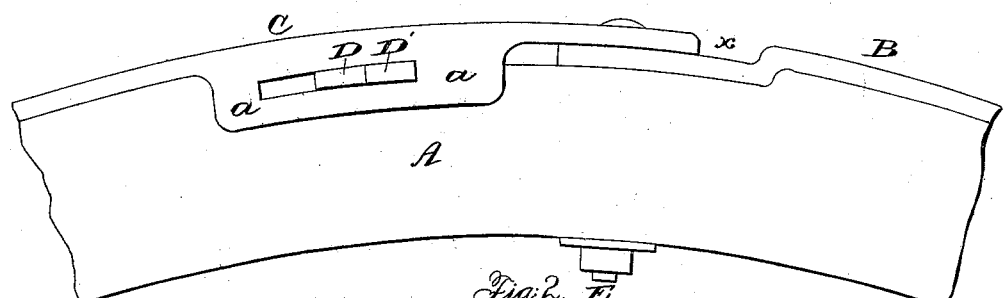
Figure 2:
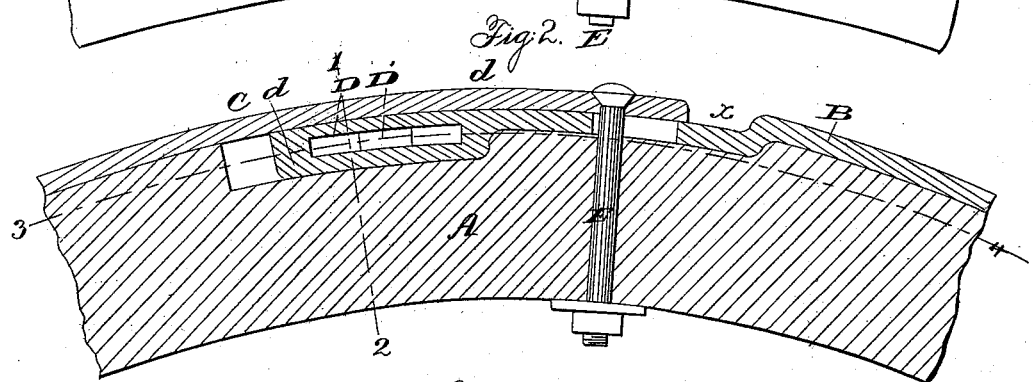
Figure 3:
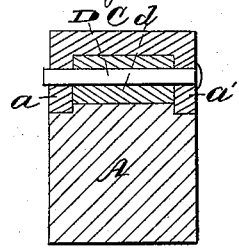
Figure 4:
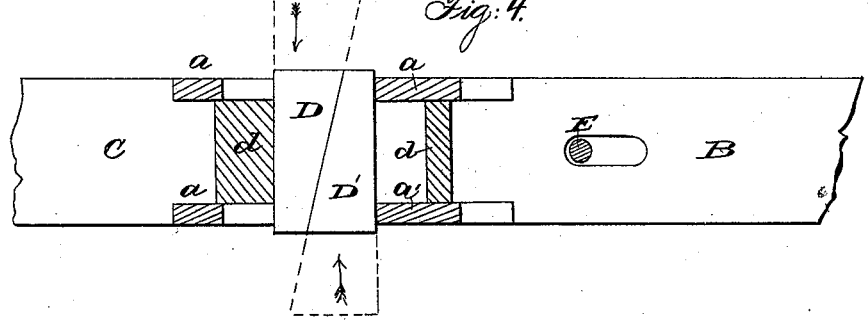

On reference to the drawing which forms a part of this specification, Figure 1 is an exterior view of a portion of the felly of an ordinary wagon wheel, illustrating my improved mode of securing and tightening the tire to the same; Fig. 2 a sectional view of Fig. 1; Fig. 3 a transverse section on the line 1, 2 (Fig. 2); Fig. 4 a sectional plan on the line 3, 4 (Fig. 2) of the tire inverted.

Similar letters refer to similar parts throughout the several views.

A represents a portion of the felly of an ordinary wagon wheel, B one end, and C the other end of the tire, the whole of which with the exception of the two ends illustrated in the drawing consists of a plain iron bar bent and adapted to the felly. Near the end C of the tire, and forming part of the same, are two lips $a$ and $a'$ each having an oblong slot through which the taper keys D and D' pass. The end B of the tire is bent downward to a distance equal to the thickness of the end C, which laps over so that the outer circumference of the tire represents a true circle, interrupted only at the point $x$, where a recess is formed between the end C and the shoulder formed by the bend on the end B, a space being necessary at this point in order to allow the ends of the tire to be drawn toward each other when the keys are driven. In the felly is cut a recess for the reception of the enlarged portion $d$ of the end B which has also an oblong slot through which the keys pass. A bolt E passes through an orifice in the end C, through an oblong slot in the end B, and through the felly, on the underside of which it is furnished with a nut by turning which the two ends of the tire are bound closely to each other and to the felly.

It will be observed that the taper key D bears against the inside of the outer end of the slot in the enlarged portion $d$ of the end B of the tire, and the key D' against the inside of the inner end of the slots in the lips $a$ and $a'$ of the end C, so that when the keys are driven in the direction of the arrows (Fig. 4) the two ends of the tire must be drawn toward each other and the whole become tightly bound around the felly. The recess in the felly for the enlarged portion $d$ of the end B, the slot in the same for the keys, as well as the slots in the lips $a$ and $a'$, and the oblong slot through which the bolt E passes, are all of length sufficient to allow the ends of the tire to be drawn together and the whole tightened to the felly. In attaching the tire to the wheel in the first instance I propose to heat and shrink it to the felly, when the keys are driven so far through the slots that the points only just project beyond the lips and when the ends of the tire are drawn to their farthest distance apart.

When by constant exposure and hard usage, or by the shrinking of the wheel, the tire becomes loose, the original keys may be removed and new ones driven so far through the slots as to draw the tire tightly around the felly, after which the ends may be cut off so as not to project an inconvenient distance on each side of the wheel, and the small ends of the keys riveted so as to maintain them in their proper position. It will thus be seen that the tire may be readily tightened to the wheel without resorting to the usual tedious process of removing and rewelding or the insecure mode of driving wedges between the felly and tire.

Disclaiming the exclusive use of taper keys for drawing together the two ends of the tire, I claim and desire to secure by Letters Patent:—

The end C with its slotted lips $a$, and the bent end B with its slotted enlargement $d$, in combination with the taper keys D and D' and bolt E, when the two ends are arranged and adapted to each other substantially in the manner set forth and for the purpose specified.

In testimony whereof, I have signed my name to this specification before two subscribing witnesses.

ROBERT B. SCOTT.

Witnesses:
HENRY HOWSON,
H. ODIORNE.